United States Patent
Salla et al.

(10) Patent No.: US 9,567,510 B2
(45) Date of Patent: Feb. 14, 2017

(54) CYANAMIDE-BASED CARBON DIOXIDE AND/OR HYDROGEN SULFIDE SCAVENGERS AND METHODS OF USE IN SUBTERRANEAN OPERATIONS

(71) Applicant: Halliburton Energy Services, Inc., Houston, TX (US)

(72) Inventors: Rajender Salla, Pune (IN); Neelam Deepak Raysoni, Pune (IN); Sushant Dattaram Wadekar, Pune (IN); Vijaya Kumar Patnana, Andhra Pradesh (IN)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/026,390

(22) PCT Filed: Sep. 11, 2014

(86) PCT No.: PCT/US2014/055102
§ 371 (c)(1),
(2) Date: Mar. 31, 2016

(87) PCT Pub. No.: WO2016/039750
PCT Pub. Date: Mar. 17, 2016

(65) Prior Publication Data
US 2016/0237335 A1    Aug. 18, 2016

(51) Int. Cl.
*C09K 8/54*   (2006.01)
*E21B 41/02*   (2006.01)
*C09K 8/532*   (2006.01)

(52) U.S. Cl.
CPC ............... *C09K 8/54* (2013.01); *C09K 8/532* (2013.01); *E21B 41/02* (2013.01); *C09K 2208/10* (2013.01); *C09K 2208/32* (2013.01)

(58) Field of Classification Search
None
See application file for complete search history.

(56) References Cited

U.S. PATENT DOCUMENTS

| | | |
|---|---|---|
| 1,977,210 A | 10/1934 | Schulenberg |
| 1,996,730 A | 4/1935 | Thomas et al. |
| 2,006,762 A | 7/1935 | Gams et al. |
| 2,353,997 A | 7/1944 | Cooper |
| 2,393,917 A | 1/1946 | Lewis |
| 2,557,980 A | 6/1951 | Lane, Jr. et al. |

(Continued)

OTHER PUBLICATIONS

International Search Report and Written Opinion issued in related PCT Application No. PCT/US2014/055102 mailed May 29, 2015, 10 pages.

(Continued)

*Primary Examiner* — Alicia Bland
(74) *Attorney, Agent, or Firm* — Craig W. Roddy; Baker Botts L.L.P.

(57) ABSTRACT

$CO_2$ scavenging additives having one or more cyanamide functionalities for the reduction of corrosion in subterranean formations are disclosed. The additives are also suitable for the simultaneous scavenging of $CO_2$ and $H_2S$. The additives can be introduced by way of a treatment fluid for the subterranean formation to interact with and reduce the concentration of $CO_2$ and/or $H_2S$ in the formation.

20 Claims, 1 Drawing Sheet

(56) References Cited

U.S. PATENT DOCUMENTS

| | | | |
|---|---|---|---|
| 2,700,652 | A | 1/1955 | Menaul |
| 3,501,524 | A | 3/1970 | Krulik et al. |
| 3,723,522 | A | 3/1973 | Kersten et al. |
| 4,809,780 | A * | 3/1989 | Shen .................. C09K 8/60 166/248 |
| 6,013,200 | A | 1/2000 | Prince |
| 8,197,834 | B2 | 6/2012 | Rodriguez-Kabana et al. |
| 8,420,634 | B2 | 4/2013 | Anzini et al. |
| 8,501,732 | B2 | 8/2013 | Bilotta et al. |
| 8,557,329 | B2 | 10/2013 | Dai et al. |
| 8,569,355 | B2 | 10/2013 | Laudon et al. |
| 8,609,712 | B2 | 12/2013 | Wilk et al. |
| 8,633,197 | B2 | 1/2014 | Bongartz et al. |
| 8,648,076 | B2 | 2/2014 | Guedat et al. |
| 8,737,039 | B2 | 5/2014 | Michot et al. |
| 2003/0033934 | A1 | 2/2003 | Espin et al. |
| 2003/0060662 | A1 * | 3/2003 | Srinivasa ............ C07C 335/02 564/25 |
| 2011/0163264 | A1 | 7/2011 | Hu |
| 2011/0220358 | A1 * | 9/2011 | Robinson ............ B01D 15/00 166/301 |
| 2012/0132443 | A1 | 5/2012 | Van Straelen |
| 2012/0216678 | A1 | 8/2012 | Geuzebroek et al. |
| 2013/0277055 | A1 * | 10/2013 | Favero ................ E21B 43/16 166/305.1 |
| 2013/0342069 | A1 | 12/2013 | Rowe |

OTHER PUBLICATIONS

Ragamathunnisa, M., Padmavathy, R. and Radha, N., 2012. Ultrasonic and Spectroscopic Ivestigation of Thiourea in Non-Aqueous Media. International Journal of Current Research and Review, 4(23), p. 30-41.

Lai, B.H., Yeh, C.C. and Chen, D.H., 2012. Surface modification of iron oxide nanoparticles with polyarginine as a highly positively charged magnetic nano-adsorbent for fast and effective recovery of acid proteins. Process Biochemistry, 47(5), pp. 799-805.

Huang, G., Zhang, C., Li, S., Khemtong, C., Yang, S.G., Tian, R., Minna, J.D., Brown, K.C. and Gao, J., 2009. A novel strategy for surface modification of superparamagnetic iron oxide nanoparticles for lung cancer imaging. Journal of materials chemistry, 19(35), pp. 6367-6372.

Liu, C., Peng, B., Li, S., Park, C.M., Whorton, A.R. and Xian, M., 2012. Reaction based fluorescent probes for hydrogen sulfide. Organic letters, 14(8), pp. 2184-2187.

Liu, T., Xu, Z., Spring, D.R. and Cui, J., 2013. A lysosome-targetable fluorescent probe for imaging hydrogen sulfide in living cells. Organic letters, 15(9), pp. 2310-2313.

Liu, C., Peng, B., Li, S., Park, C.M., Whorton, A.R. and Xian, M., 2012. Reaction based fluorescent probes for hydrogen sulfide. Organic letters, 14(8), Supporting Information.

Liu, T., Xu, Z., Spring, D.R. and Cui, J., 2013. A lysosome-targetable fluorescent probe for imaging hydrogen sulfide in living cells. Organic letters, 15(9), Supporting Information.

* cited by examiner

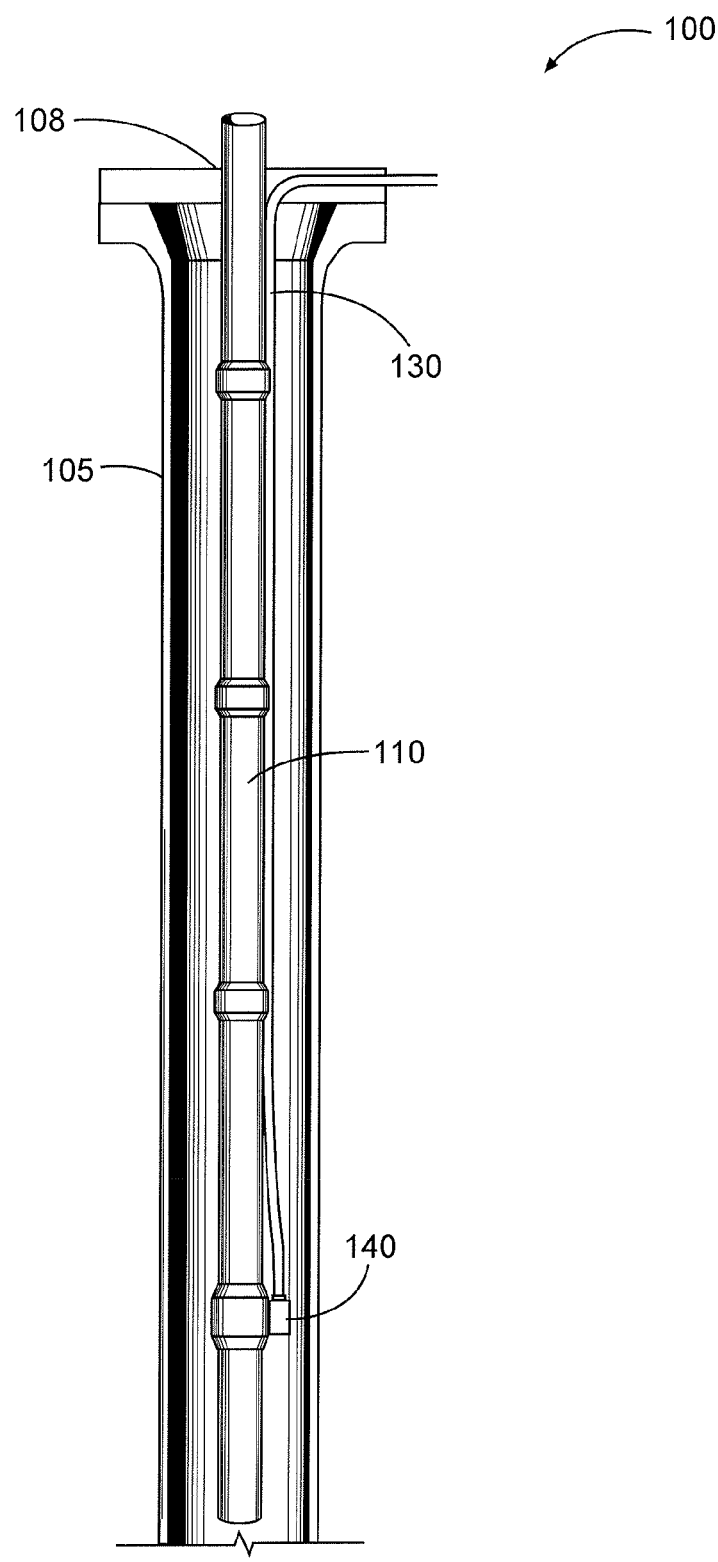

CYANAMIDE-BASED CARBON DIOXIDE AND/OR HYDROGEN SULFIDE SCAVENGERS AND METHODS OF USE IN SUBTERRANEAN OPERATIONS

CROSS-REFERENCE TO RELATED APPLICATION

The present application is a U.S. National Stage Application of International Application No. PCT/US2014/055102 filed Sep. 11, 2014, which is incorporated herein by reference in its entirety for all purposes.

BACKGROUND

The present disclosure relates to fluids, additives, and methods for use in subterranean operations, and more specifically, to improved methods and additives for scavenging carbon dioxide and/or hydrogen sulfide for use in subterranean formations and fluids.

Carbon dioxide ($CO_2$) is a corroding agent commonly encountered in the production of oil and gas. While dry $CO_2$ is noncorrosive within the range of temperatures encountered during oil and gas production, $CO_2$ in an aqueous phase forms carbonic acid, which corrodes tubings, casings, and other types of well bore and pipeline equipment. Carbonic acid corrosion can erode and ultimately destroy oil and gas conduits, and can also choke production by causing scaling on the inner surface of production conduits or within the producing formation itself. Carbonic acid corrosion can also corrode cement sheathing, compromising the structural integrity and zonal isolation of wellbores. Carbonic acid corrosion is generally greater under conditions of high temperature and low pH, and is also influenced by flow rates within the conduit and the presence of other corrosive agents in the aqueous phase.

Oil and gas reservoirs are often characterized according to whether or not they contain hydrogen sulfide ($H_2S$), a pungent and toxic gas that is also acidic and highly corrosive in the aqueous phase. Aqueous $H_2S$ forms highly corrosive sulfides which accelerate conduit and infrastructure erosion and scaling. $H_2S$-containing reserves are described as "sour," while reserves generally free of $H_2S$ are referred to as "sweet." Corrosion due to carbon dioxide occurs in the production of sweet gas, but is significantly exacerbated in the production of sour gas. Carbon steel tubing, such as coiled tubing for wellbores, is particularly susceptible to corrosion due to aqueous carbonates and sulfides.

Corrosion due to $CO_2$ and sulfide ultimately results in cracking or obstruction of production equipment, such as tubing and other conduits. Prevention of equipment failure due to corrosion requires costly production shutdowns and frequent workovers, and limits the productive life of reservoirs by making continued production economically unfeasible. Thus, it is typically desirable to reduce or eliminate $CO_2$ and, where present, $H_2S$ from subterranean formations and well bores to reduce corrosion rates and extend the productive life of hydrocarbon reservoirs.

Although scavengers are often used to convert $H_2S$ to a more inert form, the use of $CO_2$ scavengers is not common in the production of oil and gas. $H_2S$ scavengers include certain aldehydes, certain amine-based chemicals, triazines, copper compounds, hydrogen peroxide, zinc compounds, and iron compounds. However, the reaction products of many of these compounds are poorly soluble in treatment fluids and/or fluids in the well bore, or may decompose, thereby releasing $CO_2$ or $H_2S$. Moreover, conventional corrosive gas scavengers may have undesirable environmental and/or toxicity profiles, and as such may be impractical to use or prohibited altogether in certain circumstances and/or jurisdictions. Where $CO_2$ scavenging is desired in oil and gas production, separate $CO_2$ and $H_2S$ scavengers are typically used, increasing costs and compounding environmental concerns.

BRIEF DESCRIPTION OF THE FIGURES

These drawings illustrate certain aspects of some of the embodiments of the present disclosure, and should not be used to limit or define the disclosure.

FIG. 1 is a diagram illustrating an injection system that may be used in accordance with certain embodiments of the present disclosure.

While embodiments of this disclosure have been depicted and described and are defined by reference to example embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

Illustrative embodiments of the present disclosure are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming, but would nevertheless be a routine undertaking for those of ordinary skill in the art having the benefit of the present disclosure.

The present disclosure relates to compositions, treatment fluids and methods for scavenging carbon dioxide and/or hydrogen sulfide in subterranean operations, pipelines, and other related operations. Specifically, the methods and compositions of the present disclosure generally involve the synthesis and use of additives containing one or more cyanamide moieties to scavenge carbon dioxide and/or hydrogen sulfide. In the methods of the present disclosure, a scavenger of the present disclosure may be placed in or near a subterranean formation, well bore, pipeline, or other location where $CO_2$ scavenging is desired. At least a portion of the scavenging additive can then interact with carbon dioxide to reduce the amount of carbon dioxide in the selected location.

The fluids and scavenging additives of the present disclosure generally comprise one or more cyanamides. The term "cyanamide" is defined herein to include any compound containing one or more $CN_2$ moieties as well as any particle modified to include one or more such compounds. In certain embodiments, the scavenging additives of the present disclosure may react in aqueous solution with dissolved $CO_2$ to form $CaCO_3$ and $NH_2CN$ according to a reaction similar to the reaction of Formula (I) below:

$$Ca(CN)_2 + CO_2 + H_2O \rightarrow CaCO_3 + NH_2CN \qquad (I)$$

In certain embodiments, the scavenging additives of the present disclosure may react with both $CO_2$ and $H_2S$ to form thiourea, a soluble corrosion inhibitor; or, in certain embodiments wherein $CO_2$ is fully scavenged from or absent in the subterranean formation, the $CO_2$ scavenging additives of the present disclosure may react in aqueous solution with $H_2S$ to form thiourea.

The scavenging additives used in the present disclosure may exhibit, among other features, an enhanced ability to reduce corrosion in a subterranean formation as compared to conventional scavengers due, at least in part, to the manner in which they react with hydrogen sulfide and carbon dioxide. In particular, scavenging additives of the present disclosure can exhibit a dual corrosion inhibition mechanism whereby the concentration of corrosive acid gases is reduced by chemical reaction to produce the anticorrosive and environmentally benign byproduct thiourea. Where both carbon dioxide and hydrogen sulfide are present, this reaction can proceed by a single step according to a reaction similar to the reaction of Formula (II) below:

(II)

Where carbon dioxide has been fully scavenged or is absent, the reaction of the scavenging additive can proceed with hydrogen sulfide according to a reaction similar to the reaction of Formula (III) below:

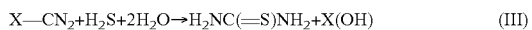
(III)

However, the reaction mechanisms disclosed herein are provided only as non-limiting illustrations of how the scavenging additives of the present disclosure may react in certain embodiments, and are not intended to limit the scope of the disclosure recited in the claims.

According to a further advantage associated with the scavenging additives disclosed herein, the rate of the scavenging reaction between one or more cyanamides and $CO_2$ and/or $H_2S$ may increase with increasing temperature. As noted, the rate of $CO_2$ and $H_2S$ corrosion also may correlate with increasing temperature. Accordingly, in certain embodiments, the scavenging additives as disclosed can preferentially scavenge $CO_2$ at regions within a subterranean formation most susceptible to corrosion.

According to a further advantage associated with the scavenging additives disclosed herein, the rate of the scavenging reaction between one or more cyanamides and $CO_2$ and $H_2S$ may increase with increasing $CO_2$ and/or $H_2S$ concentration Accordingly, the scavenging additives as disclosed can preferentially scavenge (and be consumed at) regions within a subterranean formation most susceptible to corrosion.

The cyanamides used in the methods, fluids, and scavenging additives of the present disclosure may comprise any $R_2$—N—C≡N or R—N—C—N—R moiety known in the art, including, but not limited to, cyanamides, dicyanamides, and dicyandiamides. Thus, and by way of example only and not limitation, such cyanamides can comprise alkyl cyanamides, allyl cyanamides, dialkyl cyanamides, dialkyl dicyandiamides, diallyl cyanamides, diallyl dicyandiamides, and combinations thereof, as well as more complex organic compounds, such as ethylmethyl sulfa-cyanamide derivatives, piperidine cyanamide derivatives, piperazine cyanamide derivatives, pyyrole-indole cyanamide derivatives, pyrazine cyanamide derivatives, quinolone cyanamide derivatives, indole cyanamide derivatives, and combinations thereof. In additional embodiments, the cyanamides of the present disclosure can further comprise cyanamide dimers (i.e., guanidine and guanidine derivatives), trimers (i.e., melamine and melamine derivatives), and combinations thereof. In additional embodiments, the cyanamides of the present disclosure can comprise a metal cyanamide, such as calcium cyanamide, sodium cyanamide, or potassium cyanamide, or a combination of metal cyanamides. In still additional embodiments, the cyanamides of the present disclosure can comprise a composite material, such as a composite nanoparticle comprising a cyanamide. By way of example, the cyanamide can comprise a composite nanoparticle of iron oxide modified to include one or more hydrophobic alkyl chains having a terminal polar functionality and a terminal $CN_2$ functionality. Two or more cyanamides, including the embodiments recited above, can be provided in any combination desired.

One example of a scavenging additive that may be suitable for use in the present disclosure comprises calcium cyanamide, also known as nitrolime. In these embodiments, the rate of the scavenging reactions may be greater at temperatures greater than 90° Celsius. Advantageously, calcium cyanamide is soluble in the aqueous phase, allowing the scavenging additive to be dissolved at high concentrations in an aqueous treatment fluid for introduction to a subterranean formation, such as by pumping.

In certain embodiments, and as noted, the cyanamide can comprise a complex organic compound having a $CN_2$ moiety. Such compounds can be synthesized as described in the art. By way of example, the cyanamide can comprise an ethylmethyl sulfa-cyanamide derivative, such as the compound having the formula below:

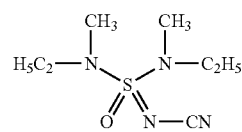

Additionally or alternatively, the cyanamide can comprise a piperidine cyanamide derivative or a piperazine cyanamide derivative, such as a compound represented by the formula below:

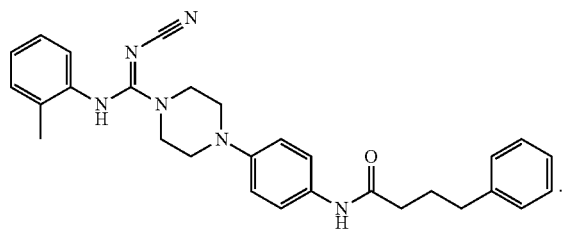 [SMILES: Cc1ccccc1N/C(=N/C#N)N1CCN(c2ccc(NC(=O)CCCc3ccccc3)cc2)CC1]

Additionally or alternatively, the cyanamide can comprise a pyrrole-indole cyanamide derivative, such as a compound represented by the formula below:

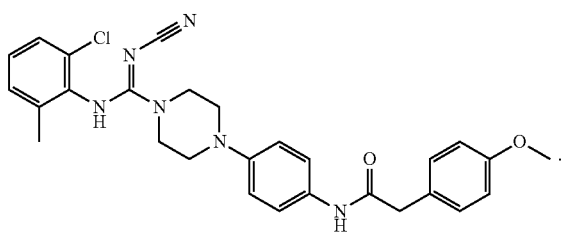 [SMILES: COc1ccc(CC(=O)Nc2ccc(N3CCN(/C(=N\C#N)Nc4c(C)cccc4Cl)CC3)cc2)cc1]

Additionally or alternatively, the cyanamide can comprise a quinolone cyanamide derivative, such as 2-cyano-9-oxo-9H-indeno[1,2-b]pyrazin-3-yl-cyanamide, or the cyanamide can comprise a pyrazine cyanamide derivative, such as

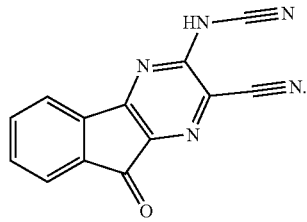 [SMILES: N#CNc1nc2c(nc1C#N)C(=O)c1ccccc1-2]

Additionally or alternatively, the cyanamide can comprise a quinolone cyanamide derivative, such as [(7-Chloro-4-oxo-1-phenyl-1,4-dihydro-quinolin-3ylmethyl)-amino]-morpholin-4-yl-methylene-cyanamide as depicted below:

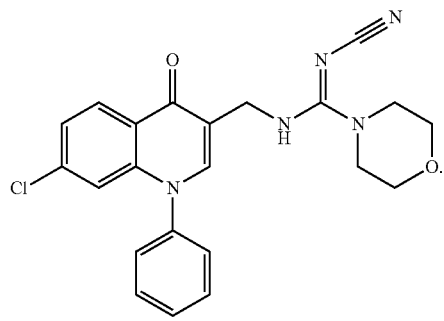 [SMILES: N#C/N=C(/NCc1cn(-c2ccccc2)c2cc(Cl)ccc2c1=O)N1CCOCC1]

Beneficially, in such scavenger embodiments, the various nitrogen containing functionalities, such as the pyrazine, piperadine, pyrrole, and indole functionalities, may provide additional corrosion inhibition. For example, nitrogen containing functionalities are generally capable of coating metal surfaces in subterranean formations by sharing their lone nitrogen electron pairs with the orbitals of the atoms forming the metal surface. In most cases, such nitrogen containing functionalities are planar, and thus able to arrange flat on a metal surface to cover a greater proportion of the surface area of the metal surface than non-planar compounds. This phenomenon is expected while pumping as well as flowing back the fluid after sour gas scavenging.

In further exemplary embodiments, the scavenging additive can comprise a guanidine derivative, such as (4H-3,1-benzothiazin-2-yl)-guanidine 1-Methyl-3-(4H-3,1-benzothiazin-2-yl)-guanidine, depicted below

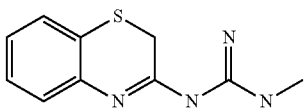

Beneficially, both cyanamide residues of the guanidine cyanamide dimer can react with $CO_2$ and $H_2S$, reducing the concentration of the additive to be provided by half relative to additives containing a single cyanamide moiety.

In certain embodiments, the cyanamide can comprise a suitable solid particle modified on its surface to include a cyanamide, such as a hydrocarbon chain of, for example, 1 to 12 carbon residues, and having a terminal cyanamide residue, and optionally containing an additional terminal polar residue, such as a carboxylate residue. Such composites can comprise additional $CO_2$ and $H_2S$ scavenging functionalities as known in the art. For purpose of illustration, in certain embodiments, the solid particle can be a magnetic nanoparticle of iron oxide. Due to the hydrophobic character of the aliphatic chains and the magnetic character of the iron oxide nanoparticles, such scavenging cyanamide embodiments can coat the corrosion-susceptible inner surfaces of steel tubular conduits, such as coiled tubing and other metal surfaces in a subterranean formation. The affinity of the scavenging additives for the metallic surfaces can inhibit corrosion highly efficiently due to the concentration of the additives at the sites of corrosion. Being nano-scale in nature, a relatively small amount of such additive would be required to coat the tubular surface.

Alternatively, and also by way of example, the solid particles can in certain embodiments be silica nanoparticles. Silica nanoparticles can be prepared from tetraethoxysilane as known in the art, and can further be reacted with tri-methoxy or tri-ethoxy $C_1$-$C_{12}$ alkyl amine; the amine functionalities can subsequently be converted to a desired cyanamide functionality. In certain embodiments, only a portion of the amine functionalities can be converted to cyanamide functionalities, with the remainder converted to additional corrosion inhibition nitrogen-containing functionalities, such as triazine or thiazine.

In certain embodiments according to the present disclosure, the scavenging additive is encapsulated. In such embodiments, the scavenging additives can be protected from reaction with and inactivation by ambient sulfides and $CO_2$ until the scavenging additives are released from the encapsulants, to thereby, for example, permit more efficient delivery of the scavenging additives downhole in a subterranean formation. Additionally or alternatively, encapsulation of scavenging additives can in certain embodiments beneficially protect the scavenging embodiments from degradation in solution due to elevated temperatures. The encapsulated scavenging additives can be released from the encapsulant by degradation or solvation of the encapsulant. Encapsulation of the scavenging additive can provide for delayed, controlled, and/or extended release of the scavenging additive, permitting scavenging for a longer period of time than non-excapsulated scavengers.

In those embodiments in which the scavenging additive is encapsulated, the encapsulant can comprise a poly(meth)acrylate blend, i.e., a polymer blend comprising homopolymer and/or copolymer made from acrylate and methacrylate. In some embodiments, the encapsulant is a blend of poly methyl methacrylate (P(MMA)) and poly methyl methacrylate-co-ethyl acrylate-co-trimethylaminoethyl methacrylate chloride (P(MMA-EA-TMAEMC)). In further embodiments, the encapsulant can by polyacrylate, polyacrylamide, polyvinyl alcohol, polyvinyl pyrrolidone, acryl amide, styrene, butadiene, N-isopropyl acryl amide, N,N-dimethyl acrylamide, or methacrylamide. The encapsulated scavenging additives can be made using known encapsulation techniques, including microencapsulation techniques. The preferred encapsulation techniques include, but are not limited to, a fluidized bed process such as the Wurster process and a modified Wurster process utilizing a top spray method. A spray drying process may also be used as a suitable encapsulation technique.

The cyanamide may be introduced to a subterranean formation in any concentration that effectively eliminates or reduces by the desired amount the concentration of carbon dioxide and hydrogen sulfide that are present or expected to be present in the subterranean formation. For example, the cyanamide may be added in a stoichiometric amount relative to the estimated amount of $CO_2$ (and, optionally, the estimated amount of $H_2S$) in the formation. As discussed below, an initial amount of the $CO_2$ scavenging additives of the present disclosure comprising one or more cyanamides may be introduced to a subterranean formation, and subsequently, additional amounts may be added to the same formation. This technique may be used, among other purposes, to increase and/or maintain a concentration of the one or more cyanamides that is sufficient to effectively eliminate or reduce by the desired amount the concentration of $H_2S$ or $CO_2$ in the formation throughout the course of a given operation.

As noted, a primary byproduct of the reaction of the scavenging additives of the present disclosure may be thiourea, which is itself a soluble anticorrosive compound. Thiourea also exhibits affinity for metallic surfaces of equipment and conduits in subterranean formations. Accordingly, and in certain embodiments according to the present disclosure, a treatment fluid comprising a scavenging additive as described can be back produced after introduction to a first subterranean formation, such as by pumping, and can be used as or added to a treatment fluid introduced to a second subterranean formation. Such introduction can occur after one or more intermediate steps, including, for example, purification treatment, such as by CleanWave® treatments (provided by Halliburton), as desired.

The molar concentration or amount of a scavenger used in the methods and compositions of the present disclosure may be similar to those used for conventional carbon dioxide scavengers. In certain embodiments, the scavengers of the present disclosure may be introduced into a solution or fluid (e.g., a fluid in a pipeline) in a concentration of from about 50 parts per million ("ppm") to about 200000 ppm. In certain embodiments, a scavenger of the present disclosure may be used in combination with one or more additional carbon dioxide and/or hydrogen sulfide scavengers. The amount of scavenger used will also depend on the amounts of $CO_2$ and $H_2S$ in the formation as well as surface area of tubular to be covered.

The scavengers of the present disclosure may be introduced in a subterranean formation and/or well bore in conjunction with one or more treatment fluids. Such treatment fluids may comprise any treatment fluid known in the art (e.g., treatment fluids suitable for use in subterranean formations). As used herein, the term "treatment fluid" refers to any fluid that may be used in an application in conjunction with a desired function and/or for a desired purpose. The term "treatment" does not imply any particular action by the fluid or any component thereof. The treatment fluids of the present disclosure generally comprise an aqueous phase. Examples of common treatment fluids include, but are not limited to, drilling fluids, spacer fluids, completion fluids, and work-over fluids. Treatment fluids of the present disclosure optionally may comprise any number of additional additives in combination with the catechol component and amine component. Other examples of such additional additives include, but are not limited to, weighting agents, surfactants, emulsifiers, acids, fluorides, fluid loss control additives, gas, nitrogen, carbon dioxide, surface modifying agents, tackifying agents, foamers, corrosion inhibitors, scale inhibitors, catalysts, clay control agents, biocides, friction reducers, antifoam agents, bridging agents, dispersants, flocculants, additional $CO_2$ and $H_2S$ scavengers, oxygen scavengers, lubricants, viscosifiers, breakers, relative permeability modifiers, resins, particulate materials (e.g., proppant particulates), wetting agents, coating enhancement agents, filter cake removal agents, and the like. A person skilled in the art, with the benefit of this disclosure, will recognize the types of additives that may be included in the fluids of the present disclosure for a particular application.

In certain embodiments, the treatment fluid comprises an aqueous solution containing an organic acid or a salt thereof, such as an alkaline earth metal salt thereof or an ammonium salt thereof. By way of example and not limitation, the organic acid can be propionic acid, with suitable salts including potassium propionate and ammonium propionate. In certain embodiments, the treatment fluid comprises about 3% to about 25% by weight of an organic acid or salt thereof. Such embodiments can beneficially exhibit extended storage stability, with reduced decomposition of scavenging additives relative to fluids not comprising an organic acid or salt thereof. In certain embodiments in which the treatment fluid comprises an organic acid or salt thereof, the scavenging additive can be hydrogen cyanamide.

The methods and compositions of the present disclosure may be used during or in conjunction with any subterranean operation. Suitable subterranean operations may include, but are not limited to, preflush treatments, afterflush treatments, drilling operations, hydraulic fracturing treatments, sand control treatments (e.g., gravel packing), acidizing treatments (e.g., matrix acidizing or fracture acidizing), "frac-pack" treatments, well bore clean-out treatments, and other operations where a treatment fluid or scavenger of the present disclosure may be useful. In certain embodiments, the methods and/or compositions of the present disclosure may be used in construction and/or operation of pipelines (e.g., transportation pipelines, distribution pipelines, etc.) or umbilical equipment that may be used, among other purposes, to transport various fluids (e.g., treatment fluids and/or fluids produced from subterranean formations).

The scavengers of the present disclosure may be introduced into a subterranean formation, a well bore penetrating a subterranean formation, tubing (including, for example, coiled tubing and cement sheathing), and/or pipeline using any method or equipment known in the art. Introduction of the inhibitors of the present disclosure may in such embodiments include delivery via any of a tube, umbilical, pump, gravity, and combinations thereof. A scavenger of the present disclosure may, in various embodiments, be delivered downhole (e.g., into the wellbore) or into top-side flowlines/pipelines or surface treating equipment. For example, these scavengers may be applied to a subterranean formation and/or well bore using batch treatments, squeeze treatments, continuous treatments, and/or combinations thereof. In certain embodiments, a batch treatment may be performed in a subterranean formation by stopping production from the well and pumping a specific amount or quantity of the scavenger into a well bore, which may be performed at one or more points in time (either separately or simultaneously) during the life of a well. In other embodiments, a squeeze treatment may be performed by dissolving the scavenger in a suitable solvent at a suitable concentration and squeezing that solvent carrying the scavenger downhole into the formation, allowing production out of the formation to bring the scavenger to its desired location. In still other embodiments, a scavenger of the present disclosure may be injected into a portion of a subterranean formation using an annular space or capillary injection system to continuously introduce the inhibitor into the formation. Other means and/or equipment that may be used to continuously inject a scavenger of the present disclosure into a well bore include, but are not limited to slip-stream systems, annulus drip systems, cap strings, umbilical strings, gas lift systems, continuous metering systems, subsurface hydraulic systems, bypass feeders, and the like. In certain embodiments, such continuous injection equipment at a well site may be controlled from a remote location and/or may be partially or completely automated. In certain embodiments, a treatment fluid comprising a scavenger of the present disclosure may be circulated in the well bore using the same types of pumping systems and equipment at the surface that are used to introduce treatment fluids or additives into a well bore penetrating at least a portion of the subterranean formation. In certain embodiments, a scavenger of the present disclosure could be dried and formed into a solid for delivery into rat holes, tanks, and/or a wellbore.

For example, a scavenger of the present disclosure may be introduced into a well bore using a capillary injection system as shown in FIG. 1. Referring now to FIG. 1, well bore 105 has been drilled to penetrate a portion of a subterranean formation 100. A tubing 110 (e.g., production tubing) has been placed in the well bore 105. A capillary injection tube 130 is disposed in the annular space between the outer surface of tubing 110 and the inner wall of well bore 105. The capillary injection tube 130 is connected to a side-pocket mandrel 140 at a lower section of the tubing 110. A scavenger may be injected into capillary injection tube 130 at the wellhead 108 at the surface (e.g., using one or more pumps (not shown)) such that it mixes with production fluid at or near the side-pocket mandrel 140. The system shown in FIG. 1 also may include one or more valves (not shown) at one or more locations along the capillary injection tube 130, among other reasons, to prevent flowback of fluid or gas to the surface through the tube. As the production fluid flows through the tubing 110, the scavenger may reduce the concentration of $CO_2$ or both $CO_2$ and $H_2S$ within the tubing, thereby reducing corrosion caused by $CO_2$ and $H_2S$ of the inner surfaces of tubing 110. Other capillary injection systems and side pocket mandrel devices (e.g., those used in gas lift production) may be used in a similar manner to the system shown in FIG. 1.

In certain embodiments, a scavenger of the present disclosure may be added to a pipeline where one or more fluids enter the pipeline and/or at one or more other locations along the length of the pipeline. In these embodiments, the scavenger may be added in batches or injected substantially continuously while the pipeline is being used.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A method comprising:
providing a treatment fluid comprising a base liquid and a scavenging additive comprising a cyanamide;
introducing the treatment fluid into at least a portion of a subterranean formation where carbon dioxide is present; and
allowing at least a portion of the treatment fluid to interact with at least a portion of the carbon dioxide to reduce the amount of the carbon dioxide present in the subterranean formation.

2. The method of claim 1 wherein the base liquid comprises an aqueous liquid.

3. The method of claim 1 wherein the cyanamide comprises at least one compound selected from the group consisting of: an alkaline earth metal cyanamide, a hydrogen cyanamide, and any combination thereof.

4. The method of claim 1, wherein the cyanamide comprises at least one compound selected from the group consisting of: $C_1$-$C_{12}$ alkyl cyanamide, dialkyl cyanamide, allyl cyanamide, alkenyl cyanamide, diallyl cyanamide, dialkenyl cyanamide, and any combination thereof.

5. The method of claim 1, wherein the cyanamide is a dicyanamide or dicyandiamide.

6. The method of claim 1, wherein the cyanamide comprises at least one compound selected from the group consisting of: an ethylmethyl sulfa-cyanamide derivative, a piperidine cyanamide derivative, a piperazine cyanamide derivative, a pyyrole-indole cyanamide derivative, a pyrazine cyanamide derivative, a quinolone cyanamide derivative, an indole cyanamide derivative, a guanidine derivative, and any combination thereof.

7. The method of claim 1, wherein the cyanamide comprises a composite nanomaterial comprising nanoparticles of iron oxide modified to include one or more $C_4$-$C_{12}$ alkyl groups having a terminal carboxyl group and a terminal cyanamide group on the surface of said nanoparticles.

8. The method of claim 7, wherein the nanoparticles are at least partially magnetic.

9. The method of claim 1, wherein the scavenging additive is encapsulated.

10. The method of claim 9, wherein the scavenging additive is encapsulated in an encapsulant comprising at least one component selected from the group consisting of: a poly(meth)acrylate blend, poly acrylate, polyacrylamide, polyvinyl alcohol, polyvinyl pyrrolidone, acryl amide, styrene, butadiene, N-isopropyl acryl amide, N,N-dimethyl acrylamide, methacrylamide, and any combination thereof.

11. The method of claim 1, wherein hydrogen sulfide is present in the subterranean formation, and wherein at least a portion of the treatment fluid interacts with the carbon dioxide and hydrogen sulfide in a single chemical reaction to produce thiourea.

12. The method of claim 11, further comprising:
recovering a portion of the treatment fluid from the subterranean formation; and
introducing the recovered treatment fluid to at least a portion of a second subterranean formation.

13. A method of treating a subterranean formation comprising carbon dioxide and hydrogen sulfide, the method comprising:
providing a treatment fluid comprising a base liquid and a scavenging additive comprising a cyanamide;
introducing the treatment fluid into at least a portion of the subterranean formation; and
allowing at least a portion of the additive to react with at least a portion of the carbon dioxide and at least a portion of the hydrogen sulfide in the fluid to reduce the amount of carbon dioxide and the amount of hydrogen sulfide present in the formation.

14. The method of claim 13, wherein at least a portion of the additive reacts with both hydrogen sulfide and carbon dioxide in a single-step reaction.

15. The method of claim 13, wherein the base liquid comprises an aqueous liquid.

16. The method of claim 15, wherein the treatment fluid comprises an organic acid or salt thereof.

17. A method of treating a cement sheath for a wellbore to prevent corrosion of the sheath, the method comprising:
contacting at least a portion of the inner surface of the cement sheath with a treatment fluid comprising a base liquid and a carbon dioxide scavenging additive comprising a cyanamide wherein carbon dioxide is present on at least a portion of the inner surface of the cement sheath and allowing at least a portion of the treatment fluid to interact with at least a portion of the carbon dioxide to reduce the amount of carbon dioxide present in the subterranean formation.

18. The method of claim 17, wherein said contacting is performed after forming the sheath but prior to insertion of a conduit therein.

19. The method of claim 17, wherein said contacting comprises introduction of the treatment fluid using a capillary injection system.

20. The method of claim 17, wherein the cyanamide comprises at least one compound selected from the group consisting of: an alkaline earth metal cyanamide, a hydrogen cyanamide, and any combination thereof.

* * * * *